United States Patent [19]

Otremba et al.

[11] Patent Number: 5,708,066
[45] Date of Patent: Jan. 13, 1998

[54] REACTION CURABLE COMPOSITION AND SOLID SURFACE MATERIAL

[75] Inventors: Edward Daniel Otremba, Orchard Park; Raymond Mitchell Friscia, North Tonawanda, both of N.Y.; Edward Francis McBride, Wilmington, Del.

[73] Assignee: E. I. Du Pont de Nemours and Company, Wilmington, Del.

[21] Appl. No.: 396,998

[22] Filed: Mar. 1, 1995

[51] Int. Cl.$^6$ .................. C08J 5/10; C08K 5/52; C08L 33/10
[52] U.S. Cl. .......... 524/127; 523/171; 524/123; 524/126; 524/430; 524/437
[58] Field of Search ............... 523/171; 524/123, 524/126, 127, 425, 436, 437, 492, 493

[56] References Cited

U.S. PATENT DOCUMENTS

| | | | |
|---|---|---|---|
| 3,847,865 | 11/1974 | Duggins | 260/42.52 |
| 4,251,576 | 2/1981 | Osborn et al. | 428/331 |
| 5,079,279 | 1/1992 | Hayashi et al. | 523/171 |
| 5,079,286 | 1/1992 | Hanisch et al. | 524/382 |

FOREIGN PATENT DOCUMENTS

| | | | |
|---|---|---|---|
| 0 308 973 A2 | 3/1989 | European Pat. Off. | C04B 26/18 |
| 0 449 456 A1 | 3/1991 | European Pat. Off. | C09J 4/04 |

*Primary Examiner*—George F. Lesmes
*Assistant Examiner*—U. K. Rajguru

[57] ABSTRACT

Acrylic compositions filled with alumina trihydrate with the mixed ester reaction product of propylene glycol methacrylate and phosphorus pentoxide have superior mechanical properties and ease of manufacture. In such acrylic compositions, the ester reaction product imparts superior properties by acting as a very effective coupling agent between the alumina trihydrate filler and the acrylic matrix.

8 Claims, No Drawings

REACTION CURABLE COMPOSITION AND SOLID SURFACE MATERIAL

BACKGROUND OF THE INVENTION

The present invention relates to filled acrylic solid surface materials. More particularly, it relates to such materials having effective coupling between the filler and the acrylic matrix.

Various patents teach different things in relation to the desirability and means for achieving coupling between filler and matrix in filled acrylic solid surface materials.

U.S. Pat. No. 4,251,576—Osborn, et al. (1981), teaches the use of silanes for tight coupling, and WO 89/05310—Frank, et al. (1989) teaches other silanes useful for loose coupling on the theory that the fillers act as crack propagation enhancers, so that partially decoupling the particle from the matrix can have the effect of quenching incipient crack propagation. Although silane coupling agents can be useful in mechanical property enhancement in such products, they can also result in whitening in the presence of water with temperature cycling. These documents are incorporated by reference herein for their disclosures of art-recognized ways to operate in the field of this invention.

Different phosphate esters known as "Zelec" materials from DuPont were used in filled acrylics in U.S. Pat. No. 3,847,865—Duggins (1974).

U.S. Pat. No. 5,079,279—Hayashi, et al. (1992) proposes the use of certain mixed mono- and di-ethyl esters of phosphoric acid to improve strength in various filled polymers, including in acrylic matrices. The resulting high molecular weights of the reaction curable mixes and other properties causes difficulties in de-areating, filling molds, pouring, pumping and line pressure.

It is desirable to improve such filled polymeric systems using more effective additives.

European Patent 449,456—Three Bond Co., Ltd. (1991) discloses a phosphate coupling agent used in the present invention, but for different uses including cyanoacrylate adhesives.

SUMMARY OF THE INVENTION

The present invention provides a reaction curable resin composition comprising a curable component, a polymerization initiator for curing the curable component, an inorganic filler such as alumina trihydrate and a phosphoric acid ester of methacrylic or acrylic acid having the formula:

$$[CH_2=C(R_1)-COO(CH(R_2)CH(R_3)O)n]y-PO(OH)x$$

where $R_1$=H or $CH_3$; $R_2$=H or $CH_3$; $R_3$=$CH_3$ or H; $R_2$ is not the same as $R_3$; n is 2 to 8; x is 1 or 2, and x+y=3. This accounts for a randomness of the propylene glycol being in head to head or head to tail configurations. Preferably n is 3 to 7, most preferably averaging 5.

DETAILED DESCRIPTION

Filled acrylic articles of the invention contain 20–80% by weight of alumina trihydrate (ATH), preferably 35–70%, sometimes more preferably about 65%, and other fillers and adjuvants can be present such as calcium carbonate. Compositions for casting preferably include initiators and syrup of about 20% polymethyl methacrylate (PMMA) dissolved in methyl methacrylate, as is known in the art. Parts, proportions and percentages herein are by weight, except where indicated otherwise.

Phosphoric acid esters of hydroxy containing methacrylates, acrylates and other vinylic compounds yield a mixture of phosphate acid esters (mono and di) that are very effective coupling agents in filled vinyl (acrylic) systems. Significantly improved mechanical properties such as flexural, and tensile properties, fatigue resistance, boiling water stability, impact resistance, hot/cold water cycling whitening resistance, and thermally induced stress crack resistance, are realized with the addition of these esters. Scanning electron micrographs of fractured surfaces show filler coupling, and as little as 0.2 parts per hundred parts of filler show improved properties. The phosphate esters are added "neat", in-situ to casting slurries of filler (e.g. alumina trihydrate or ATH) and liquid syrups (e.g. 20% polymethyl methacrylate in methyl methacrylate monomer) and in curing agents, using peroxide or azo initiation, resulting in well dispersed low viscosity fluids that yield flaw free castings with enhanced properties. The addition of these phosphate esters acts immediately compared to silane coupling agents which require pre-hydrolysis or considerable time and elevated temperature in mixes to be effective. Also, the examples of U.S. Pat. No. 5,079,279 require preheating and extended mixing before polymerization.

The following examples demonstrate the coupling activity of select examples of phosphate acid esters as measured by the increased flex toughness of the resulting castings.

The phosphate acid esters used are:

A. Mixed esters from reaction of polypropylene glycol methacrylate (average polypropylene oxide segment of 5) such as Sartomer 604, from Sartomer Co. and phosphorus pentoxide.

B. Mixed (mono and di) esters from the reaction of polyethylene glycol methacrylate (average ethylene oxide segments of 6–7) such as Blemmer Pe 350, from Nippon Oils and Fats Co. Ltd. and phosphorus pentoxide.

C. Mixed esters from reaction of polyethylene glycol methacrylate (average ethylene oxide segments 5) such as Sipomer HEM-5 from Rhone-Poulenc and phosphorus pentoxide.

D. Mixed mono-and-di-ethylene esters of U.S. Pat. No. 5,079,279.

Examples 9, 10 and 11 show how to make and use certain of these esters.

Mixes containing ATH syrup, phosphate ester, PMA and water are mixed at room temperature for 10 minutes.

The mix in a resin kettle is then evacuated of entrapped and dissolved air at 25 mm of mercury, and while under vacuum the hydroxide slurry is injected through a septum into the mix. When mix temperature reaches 30° C. with heat from mechanical mixing the GDMA (glycoldimarcapto acetate) is introduced as shown in Table 1 after 30 seconds, the vacuum is broken and the mix is transferred from the resin kettle to a mold or form. The room temperature initiator system begins reacting and a peak temperature of approximately 128° C. is reached in approximately 9 minutes. The cured solid casting is allowed to cool slowly in the mold for 5 minutes and then is removed from the mold. The casting is then cooled to room temperature. The castings, which are free of flaws and have excellent surface textures, are cut into blank rods which are then milled to give thin rods. 6

The following examples and tables illustrate the invention.

TABLE 1

Examples 1 to 3 and Comparison 1
Compositions
(phosphate acid ester concentration 0.48 parts per 100 parts filler)

|  | Examples | | | Comparative Test |
|---|---|---|---|---|
|  | 1 | 2 | 3 | 1 |
| Alumina Trihydrate (ATH) (from Alcan, particle size 40 μm) | 620 | 620 | 620 | 620 |
| Syrup (20% PMMA in MMA) | 365.3 | 365.3 | 365.3 | 365.3 |
| Phosphate acid ester | | | | |
| A | 3.01 | — | — | — |
| B | — | 3.01 | — | — |
| C | — | — | 3.01 | — |
| t-butylperoxy maleic acid (PMA) | 8.46 | 8.46 | 8.46 | 8.46 |
| Water | 0.76 | 0.76 | 0.76 | 0.76 |
| Calcium Hydroxide slurry (34% in syrup) | 4.21 | 4.21 | 4.21 | 4.21 |
| Glycoldimercapto acetate (GDMA) | 1.32 | 1.32 | 1.32 | 1.32 |

Table 2 summarizes flexural properties per ASTM D-790 giving the results of Examples 1 to 3 and Comparison 1.

TABLE 2

Flex Properties

|  | Examples | | | Comparison |
|---|---|---|---|---|
|  | 1 | 2 | 3 | 1 |
| Flex Stress (Kg(f)/sq.mm) | 8.13 | 8.25 | 8.17 | 6.88 |
| Flex modules (Kg(f)/sq.mm) | 971 | 972 | 977 | 985 |
| Work to break (J) | 0.435 | 0.459 | 0.455 | 0.287 |
| Strain (%) | 1.039 | 1.076 | 1.076 | 0.831 |

The above table shows improved toughness of over 50% in work to break for Examples 1 to 3 over Comparison 1, thus demonstrating coupling activity. Scanning election micrographs confirm coupling.

The following example and comparisons show coupling activity of phosphate acid esters in smaller particle size ATH, (8 micron) and the comparison of its activity to silane coupling.

TABLE 3

Example 4 and Comparisons 2 and 3

|  | Example 4 | Comparison 2 | Comparison 3 |
|---|---|---|---|
| ATH (Solem OE431) | 620 | 620 | — |
| ATH (Solem OE431 coated with silane) | — | — | 620 |
| Syrup | 365.3 | 365.3 | 365.3 |
| Phosphate acid ester A | 3.01 | — | — |
| PMA | 8.46 | 8.46 | 8.46 |
| Water | 0.76 | 0.76 | 0.76 |
| Calcium Hydroxide | 4.21 | 4.21 | 4.21 |
| GDMA | 1.32 | 1.32 | 1.32 |

The flex properties of articles cast from the above compositions are summarized in Table 4.

TABLE 4

Flex Properties

| Property | Example 4 | Comparison 2 | Comparison 3 |
|---|---|---|---|
| Flex stress (Kg(f)/sq.mm) | 9.78 | 8.76 | 9.56 |
| Flex modules (Kg(f)/sq.mm) | 1,002 | 988 | 1,040 |
| Work to break (J) | 0.580 | 0.434 | 0.505 |
| Strain | 1.160 | 0.996 | 1.116 |

Example 4 using the phosphate acid ester of the invention shows over 33% increased work to break over the control, Comparison 2, and an 8% improvement over Comparison 3 which is silane coated.

Effects of phosphate acid ester concentration on flex properties are shown in Table 5.

These compositions have the same ATH, syrups, PMA, water, calcium hydroxide and GDMA content as examples 1 and 2.

This series has varying amounts of phosphate acid ester A.

TABLE 5

Composition and Flex Properties
Examples 5-7 and Comparison 4

|  | Examples | | | Comparison |
|---|---|---|---|---|
|  | 5 | 6 | 7 | 4 |
| Phosphate Ester A | 2.01 | 3.00 | 4.00 | — |
| Flex stress (Kg(f)/sq.mm) | 8.2 | 8.2 | 8.16 | 6.85 |
| Flex Modules (Kg(f)/sq.mm) | 979 | 979 | 988 | 982 |
| Work to break (J) | 0.455 | 0.463 | 0.455 | 0.281 |
| Strain | 1.074 | 1.096 | 1.081 | 0.822 |

This shows that as little as 0.32 parts of phosphate acid ester (example 5) per 100 parts ATH shows enhanced activity.

Comparisons 5 and 6 show the effect of phosphate acid ester activity in calcium carbonate filled acrylic. The amount and ingredients are the same as examples 1 to 4 except that calcium carbonate is used in place of ATH, and the phosphate ester is as indicated.

TABLE 6

Composition and Flex Properties
Comparison 5 and 6

|  | 5 | 6 |
|---|---|---|
| Phosphate ester A | — | 3.0 |
| Flex Stress (Kg(f)/sq.mm) | 8.60 | 10.68 |
| Flex modules (Kg(f)/sq.mm) | 997 | 976 |
| Work to break (J) | 0.423 | 0.716 |
| % Strain | 0.986 | 1.326 |

Table 7 shows the dispersant activity of phosphate acid ester A in ATH syrup slurries. Viscosities are for Example 1 and Comparison 1 prior to addition of calcium hydroxide and GDMA accelerators (i.e. with ATH, syrup, water, PMA slurries).

TABLE 7

Viscosity Measurements
With and Without Ester
Viscosity (Pascal Sec.)
(Brookfield Model DV-2, Spindle #4)

| | 6 RPM | 12 RPM | 30 RPM | 60 RPM |
|---|---|---|---|---|
| Example 1 | 1.2 | 1.20 | 1.06 | 9.22 |
| Comparison 1 | 3.0 | 2.35 | 1.69 | 1.31 |

Example 6 and 7 and Comparisons 9 and 10 show the decreased viscosity at two diffrent speeds each from using the pentabutyl phosphate acid ester A versus a different phosphate acid ester D based on a diethyl composition having the structure:

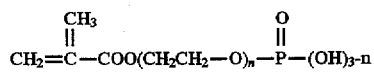

$$CH_2=C(CH_3)-COO(CH_2CH_2-O)_n-P(=O)-(OH)_{3-n}$$

The formulae for each set of tests had 650 g ATH, 332.7 g of 20% PMMA syrup, and 3.73 g EDMA. The viscosity tests were done on a Brookfield Model DV-2 Viscometer with a #4 Spindle, at the indicated RPM, for 1 minute. The results are given in Table 8. The ester concentration is given both in grams and in parts per hundred filler (pphf).

TABLE 8

Viscosity Measurements
With Ester A of Invention and
Ester D Outside the Invention

| Example | Ester A | Ester D | RPM | Viscosity (Pascal Sec) |
|---|---|---|---|---|
| 7 | 1.95 g (0.30 pphf) | | 30 | 1.460 |
| 7 | 1.95 g (0.30 pphf) | | 60 | 1.180 |
| 8 | 3.25 g (0.50 pphf) | | 30 | 1.570 |
| 8 | 3.25 g (0.50 pphf) | | 60 | 1.270 |
| Comparison | | 1.95 (0.30 pphf) | 30 | 2.540 |
| | | 1.95 (0.30 pphf) | 60 | 1.800 |
| | | 3.25 (0.50 pphf) | 30 | 3.101 |
| | | 3.25 (0.50 pphf) | 60 | 2.100 |

Examples 9 through 11 describe processes of making phosphate esters used in the invention.

EXAMPLE 9

To 730 gm (1.97 moles) of Sartomer SR604 resin and 0.2 gm of 70% phosphorous acid was added 100 gm (0.70 moles) of phosphoric anhydride over 3–4 hrs in a 2 liter resin flask under an air atmosphere. Agitation and cooling were used to maintain a temperature of 30°–40° C. The mixture was stirred one hour and then heated to 45° C. (with stirring) for 12 hours. To the resulting acid phosphate was added 14 gm (0.81 moles) of water to convert the pyrophosphate esters to the preferred monoester. The hydrolysis step normally is for 4–12 hours at 60° C. However, hydrolysis continues with storage at ambient temperatures. Then about 1,000 ppm of an polymerization inhibitor is added, such as p-methoxyphenol. The product, about 844 gm., is a light to golden yellow liquid.

EXAMPLE 10

To 357 gm (1.02 moles) of Blemmer Pe 350 from Nippon Oil & Fats Co. was added 50 gm (0.35 moles) of phosphoric anhydride slowly in an air atmosphere keeping the temperature under 40° C. The mixture was then stirred for 2–3 hours at 40° C. to allow all the phosphoric anhydride to react. The 400 gm of dark, almost black, liquid product had an acid number of 145 and was tested in filled acrylic products.

EXAMPLE 11

To 156 gm (0.51 moles) of Rhone-Poulenc's Sipomer HEM-5 was added 25 gm (0.18 moles) of phosphoric anhydride slowly in an air atmosphere keeping the temperature near 30° C. The mixture was then stirred for 5.5 hours at 50° C. to allow all the phosphoric anhydride to react. The 180 gm of light brownish-orange liquid product had an acid number of 145.

Results of Examples 10 and 11

The physical benefits of Examples 10 and 11 were seen when added to the filled acrylic products. There exists a difference between the hydrophobic/hydrophilic character of the ethylene oxide and propylene oxide adducts with Example 9 being more hydrophobic (mainly water insoluble as pure component). Thus, there may be advantages of one adduct versus the other in applications properties as well as water absorption character of the final filled-polymeric composition.

We claim:

1. A reaction curable resin composition comprising a curable component, a polymerization initiator for curing the curable component, an inorganic filler including alumina trihydrate and a phosphoric acid ester of methacrylic or acrylic acid having the formula:

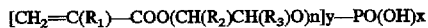

$$[CH_2=C(R_1)-COO(CH(R_2)CH(R_3)O)n]_y-PO(OH)_x$$

where $R_1$=H or $CH_3$; $R_2$=H or $CH_3$; $R_3=CH_3$ or H; $R_2$ is not the same as $R_3$; n is 2 to 8; x is 1 or 2, and x+y=3.

2. The composition of claim 1 wherein $R_1$ and $R_2$ each are $CH_3$.

3. The composition of claim 2 where in n averages 5.

4. The composition according to claim 1, wherein the phosphoric acid ester is in an amount of from 0.1 to 0.48% by weight relative to the inorganic filler.

5. The composition according to claim 1, wherein the inorganic filler is at least one member selected from the group consisting of alumina trihydrate, magnesium hydroxide, calcium carbonate and silica.

6. The compositions of claim 1, wherein n averages 5, $R_1$ and $R_2$ each are $CH_3$, the inorganic filler is alumina trihydrate, and the phosphoric acid ester is in an amount of 0.1 to 0.48% by weight relative to the inorganic filler.

7. An artificial marble obtained by molding and curing the composition according to claim 1.

8. A process of curing a resin composition by mixing the ingredients of claim 1 and permitting it to react.

* * * * *